United States Patent [19]

Shutt

[11] 4,095,084

[45] June 13, 1978

[54] METHOD AND APPARATUS FOR PERFORATING ELONGATE MEMBERS

[76] Inventor: George V. Shutt, 918 Willow Springs La., Glendora, Calif. 91740

[21] Appl. No.: 787,553

[22] Filed: Apr. 14, 1977

[51] Int. Cl.$^2$ .......................... B23K 9/00; B26D 5/00
[52] U.S. Cl. ............................... 219/121 LM; 83/365
[58] Field of Search ................. 83/362, 365, 367, 370; 219/121 L, 121 LM, 121 EB, 121 EM

[56] References Cited

U.S. PATENT DOCUMENTS

| | | | |
|---|---|---|---|
| 3,552,252 | 1/1971 | Maxey et al. | 83/362 |
| 3,582,466 | 6/1971 | Quirk | 219/121 L |
| 3,796,117 | 3/1974 | Mukai et al. | 83/365 |
| 3,808,394 | 4/1974 | Mominee et al. | 219/121 LM |
| 4,013,261 | 3/1977 | Steigerwald et al. | 219/121 EB |

*Primary Examiner*—J. V. Truhe
*Assistant Examiner*—Fred E. Bell
*Attorney, Agent, or Firm*—William W. Haefliger

[57] ABSTRACT

An elongate member, such as a tube, is perforated at intervals by intermittently feeding the member endwise through a perforating station containing a laser for directing a laser beam against the member, and pulsing the laser in timed relation to the intermittent movement of the member to produce a laser beam pulse of sufficient duration and intensity to form a hole in the member at selective times or each time when the member is arrested at the station. The particular member described is a thin walled flexible plastic drip irrigation tube which is flattened upon reaching the perforating station, preferably being pre-flattened, and which may have a single water passage defined by two walls, or which may have a primary water passage bounded by a first tube wall and a secondary water passage bounded by the first wall and a second outer tube wall. The laser beam pulses may be regulated in such a manner that the pulses penetrate only one wall of the two-wall type or, in the case of the three-wall type, so that certain of the pulses penetrate both walls to form holes in the first wall for communicating the tube passages, and the intervening pulses penetrate only the second outer wall to form water drip openings in the latter wall.

28 Claims, 11 Drawing Figures

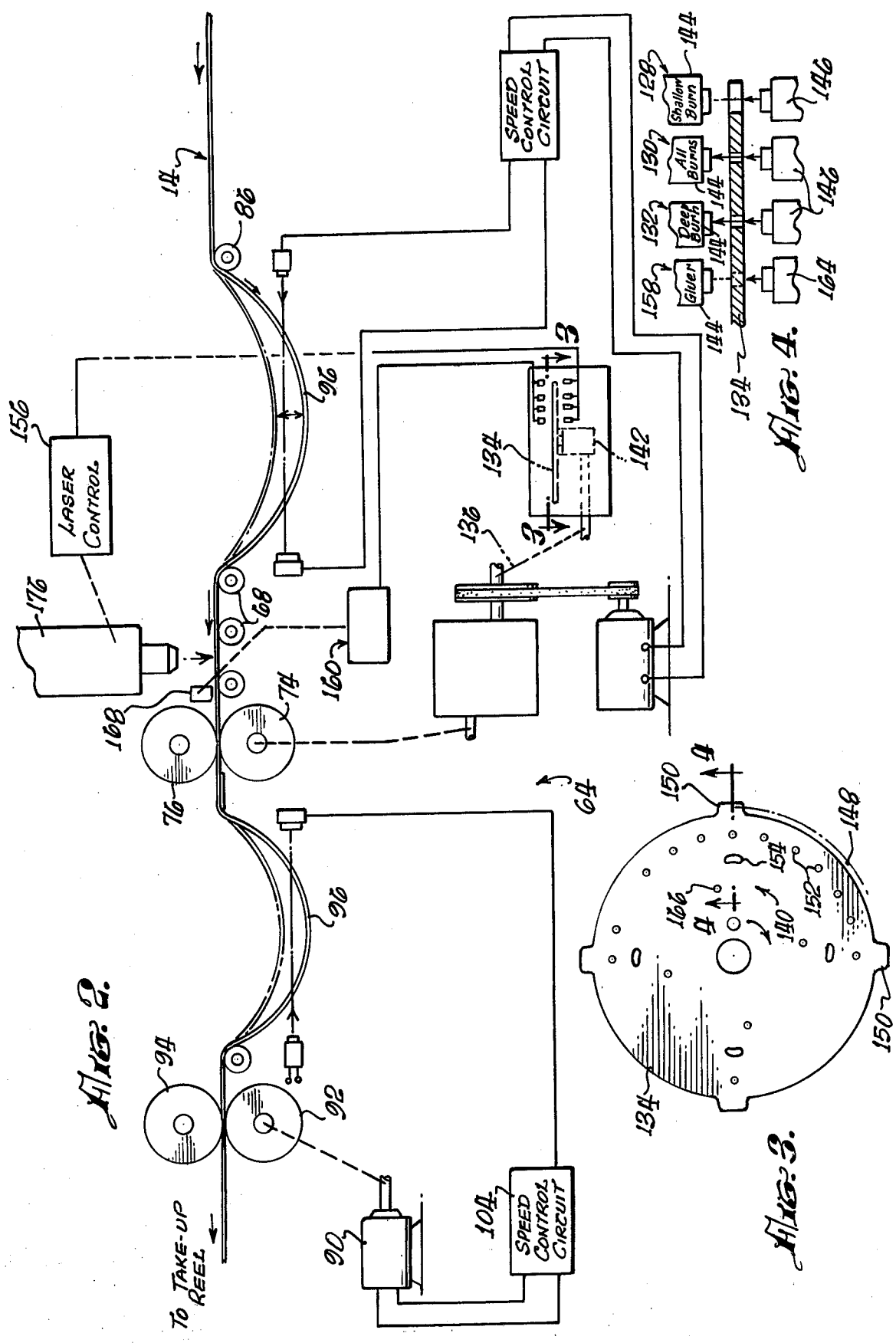

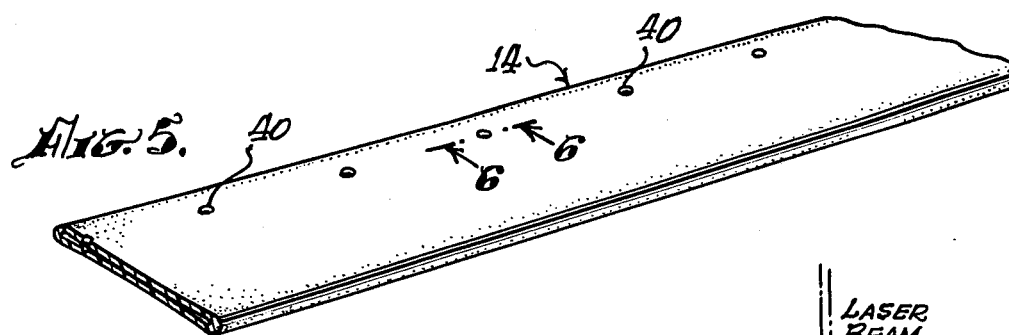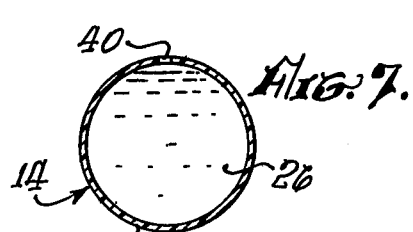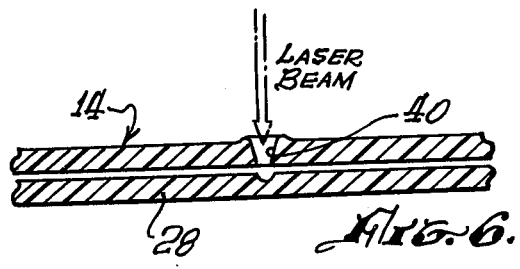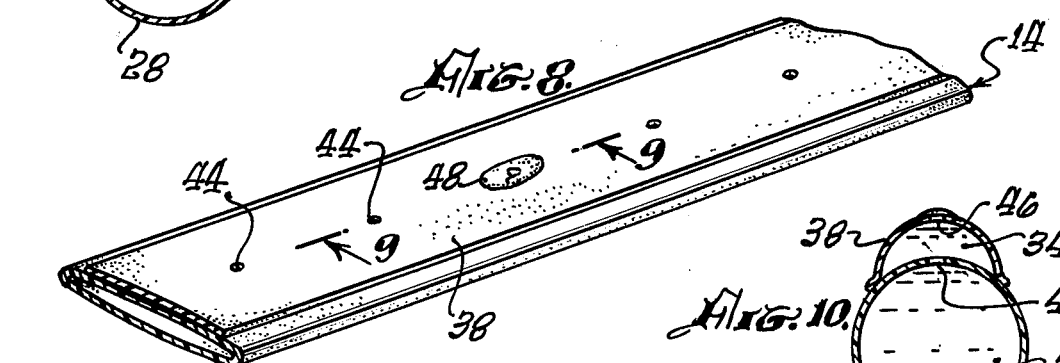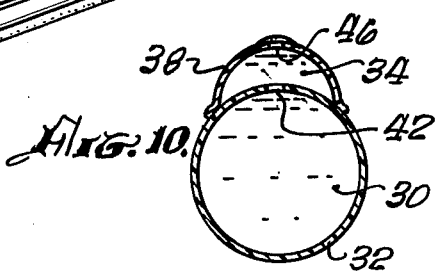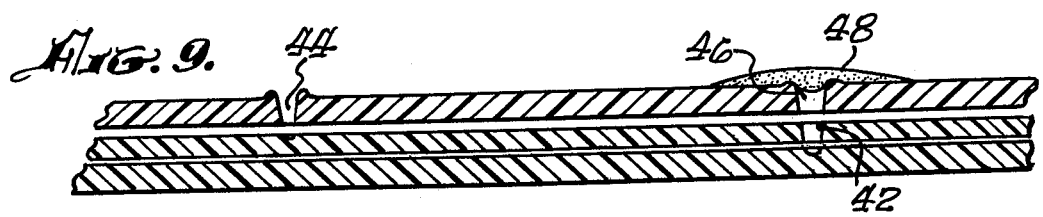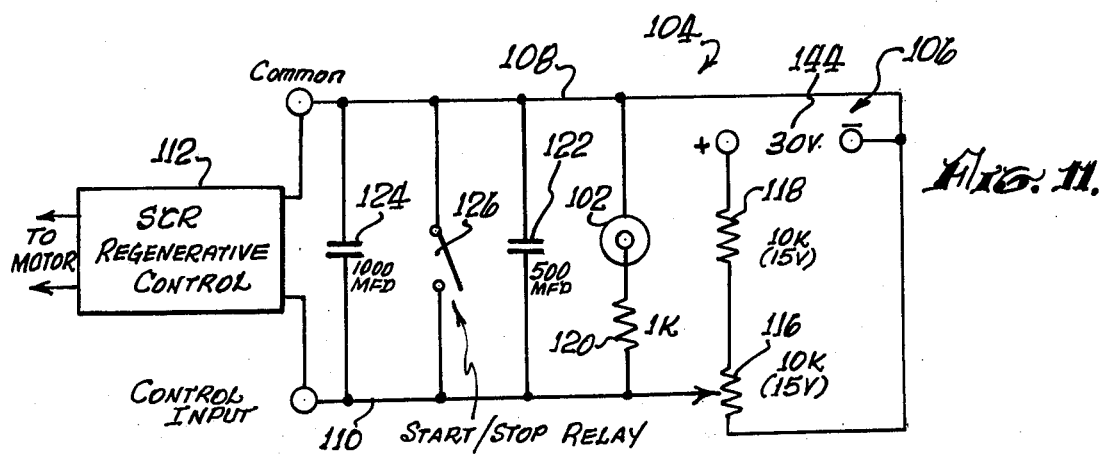

METHOD AND APPARATUS FOR PERFORATING ELONGATE MEMBERS

BACKGROUND OF THE INVENTION

1. Field of the Invention

This invention relates generally to the art of forming holes with a laser beam and more particularly to a method of and apparatus for utilizing a laser to perforate an elongate member, such as a tube, at intervals along the member.

2. Discussion of the Prior Art

As will become apparent from the ensuing description, the laser beam perforating method and apparatus of the invention may be utilized to perforate a variety of elongate members for various purposes. The primary application of the invention, however, involves perforating at intervals a thin walled flexible tube of thermoplastic material to form a so-called drip irrigation tube. Such a drip irrigation tube is a hose-like plastic tube which is laid across the ground to be irrigated and connected at one end to a source of water under pressure. Extending through the tube wall at intervals along the tube are small drip holes through which the water emerges in the form of droplets to irrigate the ground. The invention will be described in the context of this primary application.

Some drip irrigation tubes contain a single water passage. In this type of tube, all of the holes in the tube wall are drip holes which open to the passage. Other drip irrigation tubes contain a primary water passage bounded by a first tube wall and a secondary water passage bounded by a portion of the first wall and a second outer wall of the tube whereby the first wall portion forms a separation wall between the tube passages. The primary passage communicates directly at one end to the source of water under pressure. The secondary water passage extends the full length of the primary passage and communicates to the latter passage through holes located at intervals along the tube passage separation wall. The second outer tube wall contains spaced drip holes communicating to the secondary water passage through which water drips from the latter passage to the ground.

A variety of techniques have been devised for perforating drip irrigation tubes of the kind described above and other elongate members. Prior art of interest in this connection are U.S. Pat. Nos. 3,594,261, 3,626,143 and 3,808,394. Of particular interest in connection with perforating drip irrigation tubes is the above mentioned U.S. Pat. No. 3,808,394 which utilizes a laser beam to form the tube perforations or water drip holes. The laser beam perforating apparatus of this latter patent, however, has certain deficiencies which detract from its usefulness and which need not be elaborated on in detail in this disclosure. Suffice it to say that this patented apparatus is quite costly and complex and, most important, permits perforation of a tube at one fixed spacing only. The other laser perforating devices and techniques are also deficient in one way or another, and hence there is a need for an improved laser perforating method and apparatus, particularly for perforating drip irrigation tubes of the class described.

SUMMARY OF THE INVENTION

The present invention provides such an improved laser perforating method and apparatus. According to the invention, the elongate member to be perforated is intermittently fed endwise through a perforating station containing a laser in a manner such that the member is periodically momentarily arrested with a portion of the member located at the station on the laser beam axis, and the laser is pulsed in timed relation to the intermittent movement of the member to produce a laser beam pulse of such duration and intensity to form a hole of selective size in the member at selected times when the member is arrested.

In one described application of the invention, the member to be perforated is a single walled drip preflattened irrigation tube which passes through the perforating station, and the invention operates to form spaced water drip holes in the tube wall. In another described application, the member is a double walled drip irrigation tube of the kind described earlier, and the laser beam pulses are regulated in a manner such that certain of the pulses are of sufficient duration and intensity to penetrate both the outer wall and the separation wall of the tube to form in the separation wall spaced holes communicating the primary and secondary water passages of the tube. The intervening pulses are of sufficient duration and intensity to form water drip holes in the outer tube wall only.

To these ends, the laser perforating apparatus of the invention is equipped with intermittent feed means for the elongate member to be perforated and with means operable in timed relation to the intermittent movement of the member through the perforating station for pulsing the laser to perforate the member at predetermined intervals along the member. An important feature of the apparatus resides in the fact that the perforation or hole spacing may be easily changed. Another feature of the apparatus resides in the fact that the laser beam pulses may be easily regulated to have substantially the same duration and intensity for perforating single walled drip irrigation tubes or differing durations and intensities for perforating double walled drip irrigation tubes of the character described.

In the particular laser perforating apparatus described, the laser pulses are triggered and regulated by selective actuation of laser control means by a laser control member, and the control means are driven in relative movement in timed relation to the intermittent movement of the member to be perforated. The control member is provided with laser control elements which effect selective activation of the control means during this relative movement to effect pulsing of the laser in the desired timing relative to the intermittent movement of the member and with the desired sequence of laser pulse regulation.

The laser perforating apparatus of the invention provides high versatility, in that it can selectively produce holes of varying size, including very small holes, it can intersperse and space different sized holes as desired and by adjustment and/or change of control elements it can produce any desired regular or non-regular recurring pattern of holes spacing.

The apparatus effects a full stop of the elongated member at each arrest, thus to prevent elongation of holes, round holes being desirable.

The described laser perforating apparatus is particularly designed for perforating drip irrigation tubing. The tube feed means of this apparatus feeds the flattened tubing through the perforating station and operates to maintain slack loops in the tubing at opposite sides of the station so as to assure precise intermittent motion of the tubing through the station and thereby precise spacing between the water drip holes. An important feature of this feed means resides in a unique control circuit for regulating tube feed motors which maintain the proper slack loops in the tubing. Another feature of the described apparatus resides in a sealing means which is operated in timed relation to the intermittent tube movement to seal the holes in the outer wall of the double walled drip irrigation tube formed by the laser beam pulses which form the communicating holes in the inner separation wall of the tube.

BRIEF DESCRIPTION OF THE DRAWINGS

FIG. 2 is a diagrammatic illustration of the apparatus;

FIG. 3 is an enlarged view of a laser control member embodied in the apparatus;

FIG. 4 is an enlarged section taken on line 4—4 in FIG. 3;

FIG. 5 is an enlarged fragmentary perspective view of a single walled drip irrigation tube which has been perforated in the apparatus of FIG. 1;

FIG. 6 is an enlarged section taken on line 6—6 in FIG. 5;

FIG. 7 is a section through the tube when pressurized with water;

FIG. 8 is a fragmentary perspective of a double walled drip irrigation tube which has been perforated by the apparatus of FIG. 1;

FIG. 9 is an enlarged section taken on line 9—9 in FIG. 8;

FIG. 10 is an enlarged section through the double walled tube when pressurized with water, and FIG. 11 is a diagram of a motor control circuit embodied in the apparatus.

DESCRIPTION OF THE PREFERRED EMBODIMENT

Figure 1:
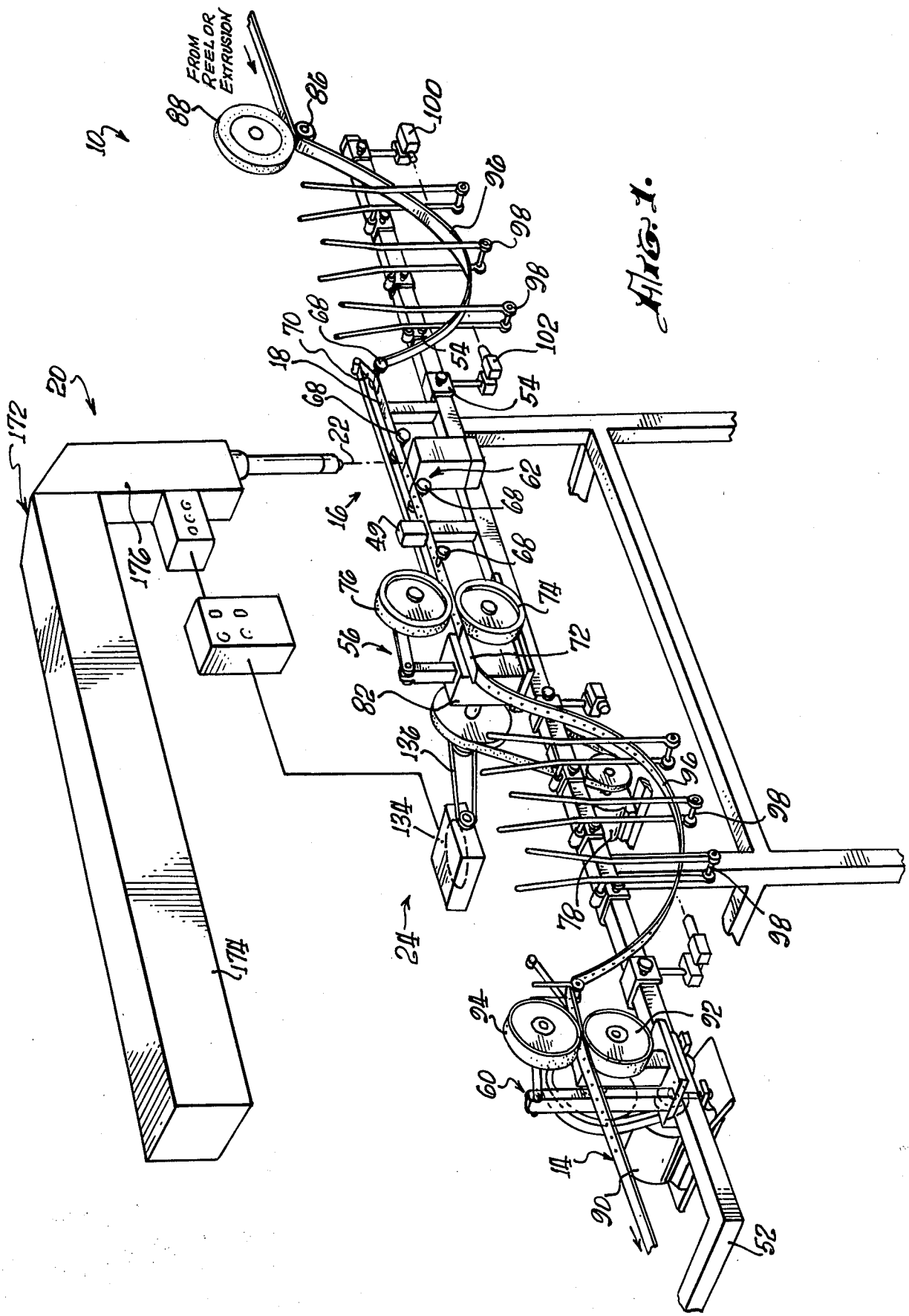
FIG. 1 is a perspective view of a laser perforating apparatus according to the invention.

Referring first to FIGS. 1-4, the illustrated laser perforating apparatus 10 comprises means 12 for feeding an elongate member 14 to be perforated through a perforating station 16 in a manner such that the member is periodically momentarily arrested with a portion 18 of the member located at the station, a laser 20 at the station for directing a laser beam 22 against the portion 18 of the member, and means 24 for pulsing the laser 20 in timed relation to the intermittent movement of the member through the station in a manner which produces a laser beam pulse of sufficient duration and intensity to form a hole of predetermined size in the member at pre-selected times when the member is arrested. As will be explained, the laser pulsing means 24 may embody means for regulating the laser beam pulses in a manner such that certain of the pulses produce deeper holes than the intervening pulses.

The particular elongate member 14 shown is a relatively thin-walled flexible plastic tube which is perforated at intervals by the apparatus 10 to form a drip irrigation tube of the kind discussed earlier. As noted, the drip irrigation tube may be a single walled tube of the type shown in FIGS. 5-7 or a double walled tube of the kind shown in FIGS. 8-10. The single walled tube has a single water passage 26 bounded by the single tube wall 28. The double walled tube has a primary water passage 30 bounded by a first tube wall 32 and a secondary water passage 34 bounded by a portion 36 of the tube wall 32 and a second outer tube wall 38. The first tube wall portion 36 thus provides, and is hereafter referred to as, a separation wall between the passages 30, 34. Being flexible, the tubes may be flattened into nearly face to face contact, as shown.

As explained below, the laser perforating apparatus 10 is operable to form water drip holes 40 in the wall 28 of the single walled drip irrigation tube at predetermined intervals or spacings along the tube. In the case of the double walled drip irrigation tube, the apparatus is operable to form holes 42 in the separation wall 36 of the tube at one interval or spacing for communicating the tube passages 30, 34 and water drip holes 44 in the outer tube wall 38 at a smaller interval or spacing. The apparatus also operates to seal certain holes 46 in the outer wall as indicated at 48.

Returning again to the laser perforating apparatus 10 of FIGS. 1-4, the apparatus has a frame 50 including an upper horizontal frame portion or table 52 which mounts the several below described components of the apparatus. These components may be attached to the frame in any convenient way, such as by the illustrated frame clamps 54. For the sake of brevity, the individual component attachments will not be described.

The intermittent feed means 12 for the member 14, in this instance plastic drip irrigation tubing, to be perforated, comprises an intermittent feed mechanism 56, variable speed infeed and outfeed mechanisms, tube supporting means 62 at the perforating station 16, and control means 64. Means 62 comprises a block 66 of laser beam energy absorbing material, such as firebrick, which is located below and supports tube 14 on the axis of the laser beam 22; means 62 further comprises tube supporting rollers 68 or the like at opposite sides of the block, an infeed hold down and drag spring 70 and an outfeed guide 72. The tube retains a flattened configuration, as shown, through the entire apparatus and particularly within the perforating station 16.

The intermittent feed mechanism 56 is located at the outfeed side of the perforating station 16. This mechanism has a lower intermittent feed roller 74 and an upper pressure roller 76 which grip therebetween the tube 14. The lower feed roller 74 is driven in intermittent rotation from a constant speed motor 78 through a belt drive 80 and a conventional intermittent rotary drive 82. Intermittent rotation of the feed roller 74 feeds the tube 14 endwise through the perforating station 16 with an intermittent movement in a manner such that a tube portion 18 is periodically momentarily arrested at the station. The travel of the tube during each intermittent rotation of the feed roller is dependent upon the rotation angle and diameter of the roller. The intermittent feed mechanism 56 effects carefully controlled acceleration during the intermittent movements, thus to render the movements as smooth as feasible to provide the important advantage of reducing whipping, jerking and slipping of the tube.

Infeed of tubing, as from a supply reel or from an extrusion machine, is provided by an appropriate infeed mechanism (not shown) which may include a feed roller 86 and a pressure roller 88 when tubing is infed from a supply reel.

The outfeed mechanism 60 is located some distance following the perforating station 16 and comprises a variable speed motor 90 driving a feed roller 92 engaging the underside of the tube 14 and a pressure roller 94 engaging the upper side of the tube. Rotation of the feed roller 92 by the motor 90 thus feeds the tube continuously away from the perforating station at a linear speed proportional to the speed of the motor.

Control means 64 controls the speed of the infeed and outfeed motors in such a way as to maintain slack loops 96 in the tube 14 in advance of and following the perforating station 16. These slack loops permit intermittent feeding of the tube through the station in a manner which achieves proper perforation of the tube in the manner explained later while permitting continuous infeed of the tube to the perforating apparatus from a tube extrusion machine, supply roll or the like and continuous outfeed of the perforated tube to a tube take-up roll or the like. The loops are contained laterally by guides 98 which prevent lateral swaying of the loops.

Control means 64 comprise a light beam source 100 and a photo detector 102 in the form of a photo transistor for sensing the vertical dimension of each slack loop 96. To this end, each light source and detector are located at opposite sides of the respective loop, as shown in FIGS. 1 and 2, at an elevation such that the loop, when properly sized, depends into the path of the light beam 104 between the light source and detector and thereby blocks light beam transmission from the source to the detector. Shortening of the loop in response to a reduction in the tube slack elevates the tube loop out of the light beam path with resultant reception of the beam by the detector. Each detector 102 is connected to a speed control circuit 104 for the corresponding infeed or outfeed drive motor 84, 90 which controls the motor speed in response to the detector output, as explained below, to maintain a slack loop of relatively constant length.

Referring to FIG. 11, each motor control circuit 104 comprises a power supply section 106 connected by leads 108, 110 to the control terminals of an SCR regenerative motor control 112 which is conventional. The output of this SCR control is connected to the corresponding infeed or outfeed drive motor 84, 90. The power supply section 106 comprises a D.C. voltage source 114, a variable voltage divider 116, and a resistor 118 connected across the leads 108, 110, whereby the voltage applied to the leads is determined by the setting of the voltage divider and is adjustable by adjustment of the divider. The corresponding slack loop photo detector 102 and a resistor 120 are connected in series with one another and across the leads 108, 110 in parallel with the SCR control and the power supply section 106. Also connected in parallel across the leads 108, 110 are two condensors 122, 124 and a start/stop relay 126.

During operation of the perforating apparatus 10 with the start/stop relays 126 of the infeed-outfeed drive motor control circuits 104 open, and assuming the tube slack loops 96 block the light beams from the loop detector light sources 100, the loop detectors 102 present open circuit paths across the control circuit leads 108, 110. Under these conditions, a control voltage determined by the setting of each control circuit voltage divider 116 is applied to the corresponding SCR motor control 112, and the SCR control energizes the respective infeed or outfeed drive motor 84, 90 with a voltage determined by the applied control voltage. Each drive motor 84, 90 then operates at a speed determined by its energizing voltage and hence by the setting of the voltage divider 116 of the control circuit 104.

From the description to this point, it will be understood that during operation of the perforating apparatus 10, the tube 14 is fed endwise, in flattened condition, continuously to and from the perforating station 16 by the infeed and outfeed mechanisms 58, 60 and intermittently through the station by the intermittent feed mechanism 56 in a manner such that the slack loops 96 are maintained at opposite sides of the station, and the tube is periodically momentarily arrested with a portion 18 of the tube located at the station. The laser pulsing means 24 pulses the laser 20 in timed relation to this intermittent tube movement through the perforating station to produce a laser beam pulse for perforating the tube portion 18 when the tube is arrested.

Referring particularly to FIGS. 1-4, the laser pulsing means 24 comprises a plurality of laser control means 128, 130, 132 which are adapted to be selectively actuated to pulse the laser 20, a laser control member 134, means 136 for driving the control means and control member in relative movement in timed relation to intermittent movement of the tube 14 through the perforating station 16 and in a manner such that the relative movement of the member with respect to the control means occurs along a closed path past the control means, and control elements 140 on the control member for periodically actuating the control means to effect periodic pulsing of the laser in response to relative movement of said control member past the control means in such a way that a laser pulse for perforating the tube 14 is produced each time the tube is arrested. As explained below, the laser control means 128, 130, 132 include means actuated by the control member 134 for regulating the laser beam pulses in such a way that certain pulses form deeper holes in the tube 14 than the intervening pulses.

In the particular embodiment shown, the laser control member 134 comprises an opaque rotary disc removably mounted on a turntable 142 in the form of a rotary speed reducer which is driven continuously from the drive motor 78 of the intermittent tube feed mechanism 56 through a belt drive connection constituting the drive means 136. It will be understood, therefore, that the laser control disc 134 rotates continuously at a reduced speed in timed relation to the intermittent movement of tube 14 through the perforating station. The disc is removable from the turntable 142 for replacement by another disc for reasons to be explained shortly.

Each laser control means 128, 130, 132 comprises a photo detector 144 in the form of a photo transistor at one side of the laser control disc 134. At the opposite side of the disc, opposite each detector, is a light source 146. The laser control elements 140 on the disc comprise transparent portions of the disc in the form of peripheral recesses 148 between opaque radially projecting tabs 150 on the disc, and holes 152, 154 through the disc. The laser control means 128, 130, 132 are aligned with the paths of rotation of the recesses and tabs 148, 150, the holes 152, and the holes 154, respectively. It will be understood, therefore, that the photo detectors 144 of the laser control means 128, 130, 132 receive light from their respective light sources 146 and are thereby actuated only during rotation of a corresponding disc portion past the detector.

The photo detectors 144 of the laser control means 128, 130, 132 are connected to a conventional laser control circuit 156 which is actuated, in the manner explained below, in response to actuation of the detectors by light from their respective light sources 146. Actuation of the photo detector for control means 130 triggers the control circuit 156 to cause the laser 20 to pulse. Phototransistors in the controller provide switching effects without the problems of unreliability and short service life of contacts and mechanical switches.

Actuation of the photo detectors for control means 128, 132 actuates the control circuit to control the pulse duration. More specifically, actuation of the detector for control means 128 actuates the control circuit to cause the laser to emit a relatively short duration laser beam pulse, while actuation of the detector for control means 132 actuates the control circuit to cause the laser to emit a relatively long duration laser beam pulse. The control circuit is adjustable to regulate these short and long pulse durations, and to provide varying pulse durations among any number of respective successive pulses, which respective durations are entirely independent of each other.

It will be understood that the control arrangements of the invention provide a high degree of versatility. By selective adjustment and by changing a control element, holes of various selected sizes may be produced, including holes at least as small as 0.008 inch diameter. The control element may be adapted to provide any desired, unrepeated pattern of holes spacing, regular or irregular, and the pattern may readily be changed simply by changing a control element. The space between holes may thus be varied, and holes may be selectively produced or not produced at respective arrests of the elongated tube.

It should be noted that the elongated member is actually stopped on the occasion of the lasing of each hole, thus to prevent elongation of the holes, round holes being desirable, particularly in the case of irrigation tubing.

In addition to the laser control means 128, 130, 132, the laser control member or disc 134 also actuates a control means 158 for a tube sealing means 160. Control means 158 includes a photo detector or photo transistor 162 above the disc and a light source 164 below the disc aligned with the rotation path of holes 166 in the disc. The sealing means 160 comprises a sealant applicator 168 mounted above the tube 14 just beyond the perforating section 16, and a control circuit 170 for the applicator. The detector 162 is connected to the control circuit 170 for actuating the latter in response to illumination of the detector through a hole 166 in the disc. The control circuit, when thus actuated, operates the sealant applicator to apply the sealant 48 (FIG. 9) to the tube, as explained later.

Turning to FIG. 1, the laser 20 comprises a generally L-shaped housing 172 including a horizontal leg 174 containing the laser proper and a vertical leg 176 containing optics (not shown) for directing the laser beam 22 vertically downward against the tube portion 18 currently located at the perforating station 16. Any suitable laser may be employed, the preferred laser being a carbon dioxide laser.

The operation of the laser perforating apparatus 10 will now be explained assuming first that the tube 14 to be perforated is a double walled tube of the kind illustrated in FIGS. 8–10. In this case, the tube is fed through the apparatus with the outer tube wall 38 uppermost. The holes 42, 44, 46, of course, will be absent from the tube as the latter enters the apparatus. The flattened tube is passed through the apparatus, whereby the tube walls are disposed in close proximity within the perforating station, as shown in FIG. 9. During operation of the apparatus, the intermittent feed mechanism 56 feeds the flattened tube intermittently through the perforating station. The infeed and outfeed mechanisms 58, 60 feed the tube continuously to and from the station at rates regulated by the infeed and outfeed drive motor speed control means 64 to maintain the slack loops 96 in the tube.

The laser control disc 134 rotates in timed relation to the intermittent movement of the tube 14 through the perforating station 16. The disc portions or openings 148, 152, 154 and tabs 150 are arranged on the disc to actuate the laser control means 128, 130, 132 in the proper sequence and timing to form or lase the holes 42, 44, 46 in the tube walls during the periods the tube 14 is arrested at the perforating station.

As indicated earlier, the apparatus of the invention provides a high degree of versatility in the selection of the hole sizes, the interspersing of holes of different sizes along the elongated member, and the producing of a recurring regular or non-regular holes spacing pattern, merely by simple changes of control elements or adjustment.

The inventor claims:

1. The method of perforating an elongate member comprising the steps of:
    (a) intermittently and relatively feeding said member endwise through a perforating station in a manner such that said member is periodically arrested with a portion of the member located at said station,
    (b) pulsing a laser in timed relation to the intermittent motion of said member though said station to produce a laser beam pulse of sufficient duration and intensity to penetrate the member when the member is arrested and directing each pulse against the portion of the member currently located at said station to form a hole in the member, and
    (c) said member being tubular, and including the step of maintaining the member in a flattened condition at said station with a gap between upper and lower flattened sections defined by the member, and with the upper section facing toward the laser beam.

2. The method of claim 1, wherein:
said laser pulsing step comprises regulating said laser beam pulses in a manner such that certain of said pulses form deeper holes in said member than the intervening pulses.

3. The method of claim 2 wherein:
said laser beam pulse regulating step comprises regulating the duration of said laser beam pulses in a manner such that said certain laser beam pulses are relatively long duration pulses and said intervening laser beam pulses are relatively short duration pulses.

4. The method of claim 1, wherein:
the firing of said laser beam is controlled in relation to said periodic arresting of said elongated member to provide a predetermined recurring pattern of spaced holes.

5. The method of claim 1 wherein:
said member is a drip irrigation tube having a wall bounding a water passage through the tube, and
each laser beam pulse has a duration of intensity sufficient to penetrate and form water drip holes in said wall.

6. The method of claim 1 wherein:
said member is a drip irrigation tube containing a primary water passage bounded by a first wall of the tube and a secondary water passage bounded by a portion of said first wall and a second outer wall of the tube, whereby said first wall portion forms a separation wall between said passages, and said laser pulsing step comprises regulating the laser beam pulses in a manner such that certain of said pulses are of sufficient duration and intensity to penetrate both said outer and separation walls to form in said separation wall holes communicating said tube passages, and the intervening pulses are of sufficient duration and intensity to penetrate only said outer wall to form water drip holes in said outer wall.

7. The method of claim 6 including the additional step of:
sealing the holes formed in said outer tube wall by said certain laser beam pulses.

8. The method of claim 7 wherein said tube walls are relatively thin flexible plastic walls.

9. The method of claim 8 wherein:
said laser beam pulse regulation step comprises regulating the duration of said laser beam pulses in a manner such that said certain pulses are relatively long duration pulses and said intervening pulses are relatively short duration pulses.

10. Apparatus for perforating an elongate, flexible member comprising:
(a) first means intermittently feeding said member endwise through a perforating station in a manner such that said member is periodically arrested with a portion of the member located at said station,
(b) a laser at said perforating station for directing a laser beam against said member portion, and
(c) other means for pulsing said laser in timed relation to the intermittent motion of said member through said station to produce a laser beam pulse of sufficient duration and intensity to penetrate the member portion at predetermined times when the member is arrested, thereby to form a hole in the portion of the member located at said station, and
(d) control means for modulating said first means to effect the formation and maintenance by the member of slack loops located before and after said station in the direction of member endwise feeding, and during said feeding of said member, so that the member passes through both said loops,
(e) and said first means includes means to maintain the member in a generally flattened condition, with a gap between member upper and lower wall sections, as the member approaches the first slack loop.

11. Apparatus according to claim 10 wherein:
said laser pulsing means comprises means for regulating said laser beam pulses in a manner such that certain of said pulses form deeper holes in said member than the intervening pulses.

12. Apparatus according to claim 11 wherein:
said laser beam pulse regulating means comprises means for regulating the duration of said laser beam pulses in a manner such that certain pulses are relatively long duration pulses and said intervening pulses are relatively short duration pulses.

13. Apparatus according to claim 10 wherein:
said laser pulsating means includes control means for controlling the firing of said laser beam in relation to said periodic arresting of said elongated member to provide a predetermined recurring pattern of spaced holes.

14. Apparatus according to claim 10 wherein:
said member is a drip irrigation tube having a wall bounding a water passage in the tube, and
each laser beam pulse has a sufficient duration and intensity to form a hole of predetermined accurate size in said tube wall.

15. Apparatus according to claim 10 wherein:
said member is a drip irrigation tube containing a primary water passage bounded by a first wall of the tube and a secondary water passage bound by a portion of said first wall and a second outer wall of the tube, whereby said first wall portion forms a separation wall between said passages, and
said laser pulsing means comprises means for regulating the laser beam pulses in a manner such that certain of said pulses are of sufficient duration and intensity to penetrate both said outer and separation walls to form in said separation wall holes communicating said tube passages, and the intervening pulses are of sufficient duration and intensity to penetrate only said outer wall to form water drip holes in said outer wall.

16. Apparatus according to claim 15 including:
means operable in timed relation to intermittent motion of said tube through said station for sealing the holes formed in the outer tube wall by said certain laser beam pulses.

17. Apparatus according to claim 16 wherein: said tube walls are relatively thin flexible plastic walls.

18. Apparatus according to claim 17 wherein:
said laser beam pulse regulating means comprises means for regulating the duration of said laser beam pulses in a manner such that said certain pulses are relatively long duration pulses and said intervening pulses are relatively short duration pulses.

19. Apparatus according to claim 10 wherein:
said laser pulsing means comprises laser control means adapted to be selectively actuated to pulse said laser, a laser control member, means for driving said control means and control member in relative movement in unison with the intermittent movement of said elongate member through said station and in a manner such that the relative movement of said control member with respect to said control means occurs along a closed path past said control means, and means including control elements on said control member for periodically actuating said control means to effect periodic pulsing of said laser in response to said relative movement of said control member past said control means.

20. Apparatus according to claim 19 wherein:
said laser control means include laser beam pulse control means periodically actuated by said actuating means for regulating said laser beam pulses in a manner such that certain of said pulses form deeper holes in said member than the remaining pulses.

21. Apparatus according to claim 20 wherein:
said laser beam pulse regulating means comprises means for regulating the duration of said laser beam pulses in a manner such that said certain pulses are relatively long duration pulses and said intervening pulses are relatively short duration pulses.

22. Apparatus according to claim 21 wherein:
said control member comprises an opaque disc which is driven rotation relative to said laser control means in unison with intermittent movement of said member through said station,
said laser control means comprise photo detectors at one side of said disc, said control elements comprise openings in said disc which rotate with the disc past said photo detectors, and said actuating means further comprise illumination means at the other side of said disc opposite said photo detectors, whereby said photo detectors are illuminated by light from said illumination means during rotation of said disc openings past said photo detectors.

23. Apparatus according to claim 10 wherein:

said member is a relatively thin walled flattened flexible plastic drip irrigation tube, said feeding means cmprises means for moving the flattened tube to said station, and said laser pulsing means comprises laser control means adapted to be selectively actuated to pulse said laser, a laser control member, means for driving said control means and control member in relative movement in unison with the intermittent movement of said tube through said station and in a manner such that the relative movement of said control member with respect to said control means occurs along a closed path past said control means, and means including control elem-ents on said control member for periodically actuating said control means to effect periodic pulsing of said laser in response to said relative movement of said control member past said control means.

24. Apparatus according to claim 23 wherein:

said laser control member means are adapted to effect a recurring irregular pattern of spaced holes along said tube.

25. Apparatus according to claim 23 wherein: said feeding means comprises an intermittent feed mechanism at said station for intermittently feeding said tube through said station, and continuous variable speed infeed and outfeed mechanisms before and after said station for feeding said tube to and from said station.

26. Apparatus according to claim 25 wherein: said control means comprises means for sensing the slack in each slack loop and a speed control circuit for each infeed and outfeed control mechanism controlled by the corresponding sensing means for increasing the speed of the respective feed mechanism in response to a reduction in the slack of the corresponding loop and decreasing the speed of the respective feed mechanism in response to an increase in the slack of the corresponding loop.

27. Apparatus according to claim 26 wherein:

said tube has an inner wall bounding a primary water passage through said tube and an outer wall forming with said inner wall an intervening secondary water passage, said inner and outer tube walls are retained in close proximity within said station, and said laser control means include laser beam pulse control means periodically actuated by said actuating means for regulating said laser beam pulses in a manner such that certain of said pulses are of sufficient duration and intensity to penetrate both said tube walls and form in said inner wall holes communicating said tube passages, and the intervening pulses are of sufficient duration and intensity to penetrate and form water drip holes in said outer tube wall only.

28. Apparatus according to claim 27 wherein:

said laser beam pulse regulating means comprises means for regulating the duration of said laser beam pulses in a manner such that said certain pulses are relatively long duration pulses and said intervening pulses are relatively short duration pulses.

* * * * *